(12) United States Patent
Song et al.

(10) Patent No.: US 11,290,246 B2
(45) Date of Patent: Mar. 29, 2022

(54) DMRS INDICATION METHOD, TERMINAL, AND BASE STATION

(71) Applicant: China Academy of Telecommunications Technology, Beijing (CN)

(72) Inventors: Yang Song, Beijing (CN); Xin Su, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 371 days.

(21) Appl. No.: 16/060,951

(22) PCT Filed: Nov. 8, 2016

(86) PCT No.: PCT/CN2016/105095
§ 371 (c)(1),
(2) Date: Jun. 10, 2018

(87) PCT Pub. No.: WO2017/097084
PCT Pub. Date: Jun. 15, 2017

(65) Prior Publication Data
US 2020/0266963 A1    Aug. 20, 2020

(30) Foreign Application Priority Data
Dec. 9, 2015 (CN) .......................... 201510907474.9

(51) Int. Cl.
*H04L 5/10* (2006.01)
*H04W 76/27* (2018.01)
(Continued)

(52) U.S. Cl.
CPC ............. *H04L 5/10* (2013.01); *H04B 7/0452* (2013.01); *H04L 5/0051* (2013.01);
(Continued)

(58) Field of Classification Search
CPC ....... H04L 5/10; H04L 5/0051; H04L 5/0073; H04L 27/2613; H04W 76/27; H04W 72/042; H04W 72/121; H04B 7/0452
See application file for complete search history.

(56) References Cited

U.S. PATENT DOCUMENTS

2011/0194536 A1    8/2011  Kim et al.
2012/0275415 A1*  11/2012  Wang .................... H04W 52/58
                                                              370/329

(Continued)

FOREIGN PATENT DOCUMENTS

CN    102082595 A    6/2011
CN    102111893 A    6/2011
(Continued)

*Primary Examiner* — Shah M Rahman
(74) *Attorney, Agent, or Firm* — Kilpatrick Townsend & Stockton, LLP

(57) ABSTRACT

Disclosed in the present invention are a demodulation reference signal (DMRS) indication method, a terminal, and a base station. The method in the present invention comprises: a first terminal obtains transmission data flow quantity indication information of all scheduled terminals in at least one scheduling resource, or obtains resource element (RE) quantity indication information occupied by DMRSs corresponding to transmission flows of all the scheduled terminals in the at least one scheduling resource; and the first terminal determines, according to the obtained indication information, RE positions configured or occupied by the DMRSs corresponding to an interference data flow of the first terminal in the scheduling resources. By means of the present invention, DMRSs in transmission of multiple data flows can be indicated, and the present invention is particularly applicable to an MU-MIMO system of a large-scale antenna array.

10 Claims, 3 Drawing Sheets

(51) Int. Cl.
*H04B 7/0452* (2017.01)
*H04L 5/00* (2006.01)
*H04L 27/26* (2006.01)
*H04W 72/04* (2009.01)
*H04W 72/12* (2009.01)

(52) U.S. Cl.
CPC ........ *H04L 5/0073* (2013.01); *H04L 27/2613* (2013.01); *H04W 72/042* (2013.01); *H04W 72/121* (2013.01); *H04W 76/27* (2018.02)

(56) References Cited

U.S. PATENT DOCUMENTS

| | | | | |
|---|---|---|---|---|
| 2012/0300709 A1* | 11/2012 | Su | ........................ | H04L 1/1893 370/328 |
| 2013/0022087 A1* | 1/2013 | Chen | .................. | H04L 27/2613 375/147 |
| 2013/0148538 A1 | 6/2013 | Ohwatari et al. | | |
| 2013/0208678 A1* | 8/2013 | Zhang | .................. | H04L 5/0053 370/329 |
| 2014/0098689 A1* | 4/2014 | Lee | ...................... | H04B 7/0639 370/252 |
| 2015/0181572 A1* | 6/2015 | Guo | ........................ | H04W 4/06 370/312 |
| 2015/0245380 A1* | 8/2015 | Li | ........................ | H04W 72/082 370/329 |
| 2015/0271814 A1* | 9/2015 | Park | ...................... | H04L 5/0082 370/329 |
| 2015/0334683 A1* | 11/2015 | Guo | .................... | H04W 72/042 370/329 |
| 2016/0142197 A1* | 5/2016 | Guo | ...................... | H04L 5/0035 370/329 |
| 2016/0157108 A1* | 6/2016 | Park | ...................... | H04W 48/16 370/329 |
| 2016/0308646 A1* | 10/2016 | Qiao | ......................... | H04L 1/00 |
| 2017/0230135 A1* | 8/2017 | Oh | ........................ | H04L 5/0048 |
| 2017/0238261 A1* | 8/2017 | Benjebbour | ........ | H04W 52/346 370/346 |
| 2020/0328781 A1* | 10/2020 | Liu | ...................... | H04L 1/0643 |

FOREIGN PATENT DOCUMENTS

| | | |
|---|---|---|
| CN | 102122985 A | 7/2011 |
| CN | 102549997 A | 7/2012 |
| CN | 102957471 A | 3/2013 |
| CN | 103209490 A | 7/2013 |
| CN | 103580790 A | 2/2014 |
| CN | 103944847 A | 7/2014 |
| CN | 104243087 A | 12/2014 |
| EP | 2890034 A1 | 7/2015 |
| WO | 2012148207 A2 | 11/2012 |

\* cited by examiner

--Prior art--

Ports 7、8、11、13
Ports 9、10、12、14

--Prior art--

DMRS INDICATION METHOD, TERMINAL, AND BASE STATION

This application is a National Stage of International Application No. PCT/CN2016/105095, filed Nov. 8, 2016, which claims priority of Chinese Patent Application No. 201510907474.9, filed with the Chinese Patent Office on Dec. 9, 2015, and entitled "A method for indicating a DMRS, a UE, and a base station", both of which are hereby incorporated by reference in their entireties.

FIELD

The present invention relates to the field of communications, and particularly to a method for indicating a DMRS, a UE, and a base station.

BACKGROUND

As the communication technologies are advancing, and there is a growing demand of a communication network for a rate and a capacity thereof, the technologies of multi-antenna Multiple-Input Multiple-Output (MIMO) are implemented in a Long Term Evolution (LTE) system to make better use of spatial resources so as to improve the spectral efficiency for an array gain, a diversity gain, a multiplexing gain, an interference-cancellation gain, etc., of a signal in the space domain. As the number of UEs is growing rapidly, a base station can transmit uplink and downlink data with a plurality of UEs concurrently in the same time-frequency resource in the technologies of Multi-User Multiple-Input Multiple-Output (MU-MIMO), so that a multi-user diversity gain, a spatial multiplexing gain, etc., can be further obtained to thereby improve the capacity of the system.

The UEs estimate a change of each transmit antenna according to a reference signal to recover data transmitted from each transmit antenna, where the reference signal can also be referred to as a pilot signal. In the LTE system, the UEs can estimate the channel using a Demodulation Reference Signal (DMRS) to demodulate the data. For a UE, the DMRS transmitted by the base station to the UE is pre-coded in the same way as the data transmitted to the UE, and the UE can determine a pre-coded equivalent channel matrix by measuring the DMRS. For an MU-MIMO system of an array of antennas at a large scale, the number of data streams being transmitted concurrently is greatly increased, so the performance of the system will be maintained more and more dependent upon the accuracy of channel estimation.

Accordingly a method for indicating a DMRS for channel estimation while multiple data streams are being transmitted has been a technical problem highly desirable to be addressed in the prior art.

SUMMARY

Embodiments of the invention provide a method for indicating a DMRS, a UE, and a base station so as to indicating a DRMS while multiple data streams are being transmitted.

An embodiment of the invention provides a method for indicating a DMRS, the method including:

obtaining, by a first UE, indication information of the number of transmission data streams of all the UEs scheduled in at least one scheduling resource, or indication information of the number of Resource Elements (REs) occupied by DMRSs corresponding to transmission data streams of all the UEs scheduled in at least one scheduling resource; and determining, by the first UE, a DMRS configuration corresponding to an interference data stream of the first UE in the scheduling resource, or RE positions occupied by DMRSs corresponding to the interference data stream according to the obtained indication information.

Optionally determining, by the first UE, the DMRS configuration corresponding to the interference data stream of the first UE in the scheduling resource according to the obtained indication information of the number of the transmission data streams of all the UEs scheduled in the at least one scheduling resource includes:

obtaining, by the first UE, a correspondence relationship between the number of transmission data streams, and a set of DMRS configurations, wherein a value of the number of transmission data streams corresponds uniquely to a set of DMRS configurations;

obtaining, by the first UE, a set of DMRS configurations corresponding to the number of transmission data streams of all the UEs scheduled in the scheduling resource according to the obtained indication information of the number of transmission data streams of all the UEs scheduled in the at least one scheduling resource, and correspondence relationship between the number of transmission data streams, and a set of DMRS configurations, and determining, by the first UE, the DMRS configuration corresponding to the interference data stream of the first UE in the scheduling resource according to the obtained set of DMRS configurations, and DMRS configurations corresponding to transmission data streams of the UE.

Wherein the correspondence relationship between the number of transmission data streams, and a set of DMRS configurations is configured by the base station to the first UE; or the correspondence relationship between the number of transmission data streams, and a set of DMRS configurations is agreed on in advance between the base station and the first UE.

Optionally, determining, by the first UE, the RE positions occupied by the DMRSs corresponding to the interference data stream of the first UE in the scheduling resource according to the obtained indication information of the number of Resource Elements (REs) occupied by the DMRSs corresponding to the transmission data streams of all the UEs scheduled in the at least one scheduling resource includes:

determining, by the first UE, RE positions occupied by the DMRSs corresponding to the transmission data streams of all the UEs scheduled in the scheduling resource according to the obtained indication information of the number of REs occupied by the DMRSs corresponding to the transmission data streams of all the first UE scheduled in the at least one scheduling resource; and determining, by the first UE, the RE positions occupied by the DMRSs corresponding to the interference data stream of the first UE in the scheduling resource according to the RE positions occupied by the DMRSs corresponding to the transmission data streams of all the first UE scheduled in the scheduling resource, wherein the determined RE positions occupied by the DMRSs corresponding to the interference data stream are located among the RE positions occupied by the DMRSs corresponding to the transmission data streams of all the scheduled UEs.

Wherein the indication information is transmitted via the following signaling: Downlink Control Information (DCI) or Radio Resource Control (RRC) signaling.

Optionally, the Downlink Control Information (DCI) is DCI in a common search space.

An embodiment of the invention provides a method for indicating a DMRS, the method including:

transmitting, by a base station, indication information of the number of transmission data streams of all the UEs scheduled in at least one scheduling resource, or indication information of the number of REs occupied by DMRSs corresponding to transmission data streams of all the first UE scheduled in at least one scheduling resource to a first UE, wherein the first UE is any one of all the scheduled terminals, and the indication information is used by the first terminal to determine a DMRS configuration corresponding to an interference data stream of the first UE in the scheduling resource, or RE positions occupied by DMRSs corresponding to the interference data stream.

Optionally, the base station transmits DCI or RRC signaling to the first UE, wherein the DCI or RRC signaling indicates to the first UE the number of transmission data streams of all the first UE scheduled in the at least one scheduling resource, or the number of REs occupied by the DMRSs corresponding to the transmission data streams of all the first UE scheduled in the at least one scheduling resource.

Optionally, the method for indicating a DMRS according to an embodiment of the invention further includes: configuring, by the base station, a correspondence relationship between the number of transmission data streams to the first UE, wherein a value of the number of transmission data streams corresponds uniquely to a set of DMRS configurations; or agreeing, by the base station and the UE, on the correspondence relationship between the number of transmission data streams and a set of DMRS configurations in advance.

An embodiment of the invention provides a UE including:
an obtaining module configured to obtain indication information of the number of transmission data streams of all the UEs scheduled in at least one scheduling resource, or indication information of the number of Resource Elements (REs) occupied by DMRSs corresponding to transmission data streams of all the UEs scheduled in at least one scheduling resource; and
a determining module configured to determine a DMRS configuration corresponding to an interference data stream of the UE in the scheduling resource, or RE positions occupied by DMRSs corresponding to the interference data stream according to the obtained indication information.

The determining module can be configured:
to obtain a correspondence relationship between the number of transmission data streams, and a set of DMRS configurations, wherein a value of the number of transmission data streams corresponds uniquely to a set of DMRS configurations;
to obtain a set of DMRS configurations corresponding to the number of transmission data streams of all the UEs scheduled in the scheduling resource according to the obtained indication information of the number of transmission data streams of all the UEs scheduled in the at least one scheduling resource, and correspondence relationship between the number of transmission data streams, and a set of DMRS configurations; and
to determine the DMRS configuration corresponding to the interference data stream of the UE in the scheduling resource according to the obtained set of DMRS configurations, and DMRS configurations corresponding to transmission data streams of the UE.

Wherein the correspondence relationship between the number of transmission data streams, and a set of DMRS configurations is configured by the base station to the UE; or the correspondence relationship between the number of transmission data streams and a set of DMRS configurations is agreed on in advance between the base station and the UE.

The determining module can be configured:
to determine RE positions occupied by the DMRSs corresponding to the transmission data streams of all the UEs scheduled in the scheduling resource according to the obtained indication information of the number of REs occupied by the DMRSs corresponding to the transmission data streams of all the UEs scheduled in the at least one scheduling resource; and
to determine the RE positions occupied by the DMRSs corresponding to the interference data stream of the UE in the scheduling resource according to the RE positions occupied by the DMRS's corresponding to the transmission data streams of all the UEs scheduled in the scheduling resource, wherein the determined RE positions occupied by the DMRSs corresponding to the interference data stream are located among the RE positions occupied by the DMRSs corresponding to the transmission data streams of all the scheduled UEs.

Wherein the indication information is transmitted via the following signaling: Downlink Control Information (DCI) or Radio Resource Control (RRC) signaling.

Optionally, the Downlink Control Information (DCI) is DCI in a common search space.

An embodiment of the invention provides a base station including:
a transmitting module configured to transmit indication information of the number of transmission data streams of all the UEs scheduled in at least one scheduling resource, or indication information of the number of REs occupied by DMRSs corresponding to transmission data streams of all the UEs scheduled in at least one scheduling resource to a first UE, wherein the first UE is any one of all the scheduled terminals, and the indication information is used by the first terminal to determine a DMRS configuration corresponding to an interference data stream of the first UE in the scheduling resource, or RE positions occupied by DMRSs corresponding to the interference data stream.

Optionally, the transmitting module is configured to transmit DCI or RRC signaling to the first UE, wherein the DCI or RRC signaling indicates to the first UE the number of transmission data streams of all the UEs scheduled in the at least one scheduling resource, or the number of REs occupied by the DMRSs corresponding to the transmission data streams of all the UEs scheduled in the at least one scheduling resource.

Optionally, the base station according to an embodiment of the invention further includes: a configuring module configured to configure a correspondence relationship between the number of transmission data streams to the first UE, wherein a value of the number of transmission data streams corresponds uniquely to a set of DMRS configurations; or agree with the first UE on the correspondence relationship between the number of transmission data streams and a set of DMRS configurations in advance.

In the method for indicating a DMRS according to the embodiment of the invention, the first UE firstly obtains the indication information of the number of transmission data streams of all the UEs scheduled in at least one scheduling resource, or the indication information of the number of REs occupied by DMRSs corresponding to transmission data streams of all the UEs scheduled in at least one scheduling resource to a first UE, where the first UE is any one of all the scheduled terminals; and the first UE further determines a DMRS configuration corresponding to an interference data stream of the first UE in the scheduling resource, or RE positions occupied by DMRSs corresponding to the interference data stream according to the indication information. As can be apparent, in the method for indicating a DMRS according to the embodiment of the invention, the UE can determine the DMRS configuration corresponding to the interference data stream of the UE in the scheduling resource, or the RE positions occupied by the DMRSs corresponding to the interference data stream. As compared with the prior art in which the terminal can only obtain allocated DMRSs corresponding to transmission data steams of the UE, in the method for indicating a DMRS according to the embodiment of the invention, the UE can further determine the DMRS configuration corresponding to the interference data stream, or the RE positions occupied by the DMRSs corresponding to the interference data stream to thereby estimate an interference covariance matrix so as to improve the accuracy of channel estimation, and guarantee the performance of detection in the receiver at the UE side, and the performance of the system as a whole.

BRIEF DESCRIPTION OF THE DRAWINGS

In order to make the technical solutions according to the embodiments of the invention more apparent, the drawings to which a description of the embodiments refers will be briefly introduced below, and apparently the drawings to be described below are merely illustrative of some of the embodiments of the invention, and those ordinarily skilled in the art can derive from these drawings other drawings without any inventive effort.

DETAILED DESCRIPTION OF THE EMBODIMENTS

In order to make the objects, technical solutions, and advantages of the embodiments of the invention more apparent, the invention will be described below in further details with reference to the drawings, and apparently the embodiments to be described below are only a part but not all of the embodiments of the invention. Based upon the embodiments here of the invention, all the other embodiments which can occur to those skilled in the art without any inventive effort shall fall into the scope of the invention.

As communication systems are advancing, the MIMO technologies have become one of crucial technologies in an LTE network system, and the capacity and throughput of the MIMO system are improved using multiple transmit antennas and multiple receive antennas. The MIMO technologies include Spatial Division Multiplexing (SDM), Spatial Diversity (SD), Beam-Forming (BM), and other technologies. The LTE network system to which the MIMO technologies are introduced can be further categorized in to a Single-User Multiple-Input Multiple-Output (SU-MIMO) system and a Multi-User Multiple-Input Multiple-Output (MU-MIMO) system according to a spatial characteristic of a UE(s). In a downlink MU-MIMO operation, two or more UEs receive a downlink signal in a specific Physical Resource Block (PRB) transmitted by a base station.

Figure 1:
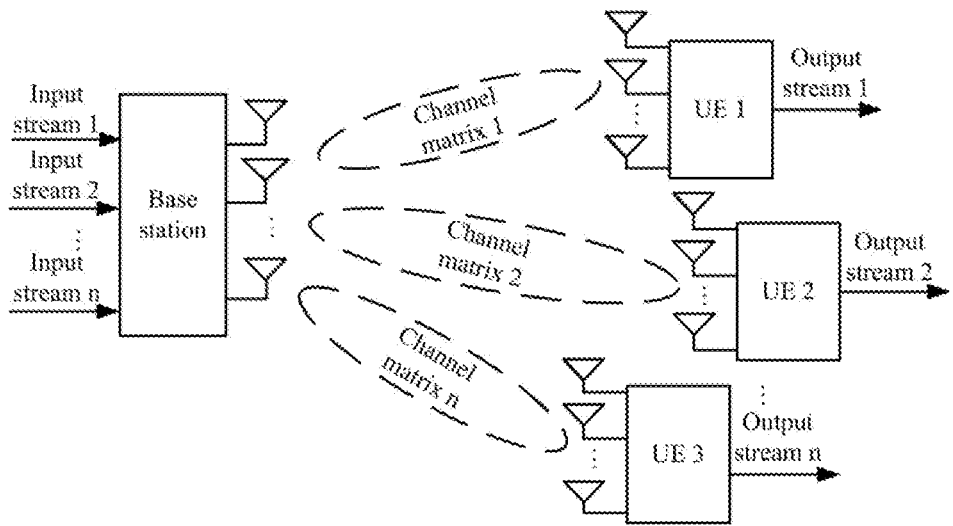
FIG. 1 is a schematic structural diagram of an LTE network system in the prior art.

A downlink MU-MIMO channel system includes a transmitter (e.g., a base station) and receivers (e.g., UEs), both of which are provided with multiple antennas, where there may be one or more transmitters, and there are generally multiple receivers. FIG. 1 illustrates a scenario in which there are one base station and multiple UEs in an MU-MIMO-enabled LTE network. In a downlink MIMO transmission process of LTE, the base station schedules the UEs, and allocate some number of raw bit streams for each scheduled UE, according to channel conditions, service characteristics, priorities, and other factors of the respective UEs, and modulates, channel-encodes, and then converts the raw bit streams allocated for each UE into one or more concurrent transmission data streams (or transmission data layers in LTE), where each transmission data stream corresponds to a Demodulation Reference Signal (DMRS) port. The transmission data streams are pre-coded, weighted, and resource-mapped into multiple transmission signals corresponding to multiple transmit antennas, and the transmission signals are transmitted through the different transmit antennas. Each UE receives the signals through an array of antennas, the number of which is not less than the number of transmission data streams of the UE, performs frequency resource inversed mapping, and processing in the space and time domains on the multiple received signals using estimated channel state information, and recovers its own transmission data streams. The multiple transmission data streams are further converted in a parallel-to-serial mode, and channel-decoded, so that the raw data bits are recovered as a result.

Here in an embodiment of the invention, the UE can be a handheld device, an on-vehicle device, a wearable device, a computing device, or another processing device connected with a wireless modem, and various forms of User Equipments (UEs), Mobile Stations (MS's), terminals, terminal equipments, etc., although the embodiment of the invention will not be limited thereto.

Here in an embodiment of the invention, the base station can be an Evolved Node B (eNB), a macro eNB, a micro eNB (referred to a small eNB), a pico eNB, an Access Point (AP), or a Transmission Point (TP), in an LTE system, a base station in a next-generation wireless communication system, etc., or the base station can be conceptualize as including cells or sectors, although the embodiment of the invention will not be limited thereto.

Here in an embodiment of the invention. LTE can be regarded as corresponding to the $3^{rd}$ Generation Partnership Project (3GPP) Release 8 (Rel-8 or R8), Release 9 (Rel-9 or R9), Release 10 (Rel-10 or R10), and Releases subsequent thereto, and the LTE network can be structured as a macro cellular, micro cellular, pico cellular, or femto network, a network including relaying and repeating nodes, various hybrid network structures (including one or more of macro cellular, micro cellular, pico cellular, and femto networks, and relaying and repeating nodes), etc., although the embodiment of the invention will not be limited thereto.

Since the UE recovers the corresponding data transmitted from each transmit antenna port by estimating channels from each transmit antenna port to all the receive antennas, a reference signal (referred to as a pilot signal) known to both the base station and the UE is required for channel estimation. A downlink reference signal is a pilot signal for downlink channel estimation to perform coherent demodulation, e.g., a Physical Downlink Shared Channel (PDSCH), a Physical Control Format Indicator Channel (PCFICH), a Physical Hybrid ARQ Indicator Channel (PHICH), and a Physical Downlink Control Channel (PDCCH). Examples of the downlink reference signal include a Common Reference Signal (CRS) shared by UEs in a coverage area of the base station, and a Dedicated Reference Signal (DRS) for a specific UE. The DMRS is a dedicated reference signal. For a UE, a DMRS transmitted by the base station to the UE is pre-coded in the same way as transmission data streams transmitted to the UE, and the UE can estimate a pre-coded equivalent channel matrix by measuring the DMRS, to thereby demodulate the data.

Figure 2:
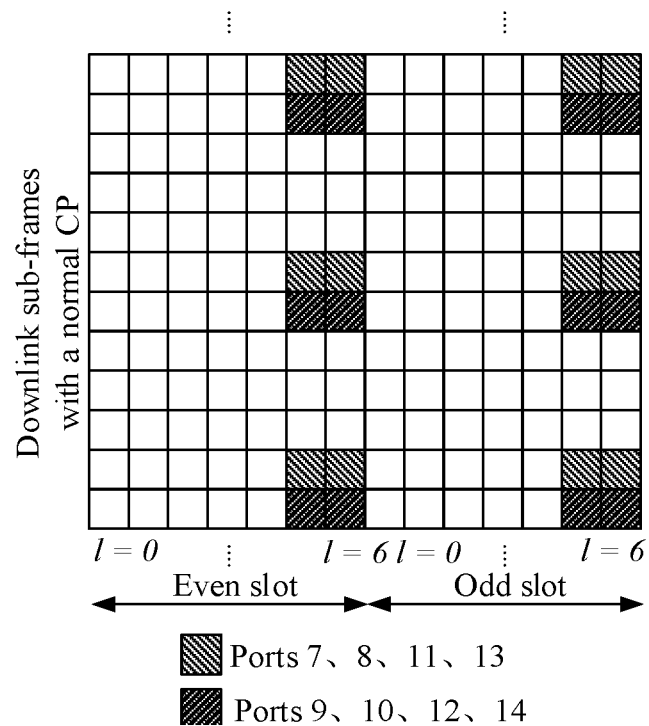
FIG. 2 is a schematic diagram of a DMRS pattern with a normal CP in the prior art.

In the LTE system, the base station schedules the UE in a scheduling resource, where a scheduling resource can be a sub-frame in the time domain, and a scheduling resource can include several PRBs (in the frequency domain). FIG. 2 illustrates a DMRS pattern (i.e., REs to which DMRSs are mapped) with a normal Cyclic Prefix (CP). Referring to FIG. 2, the horizontal axis represents the time domain, and the vertical axis represents the frequency domain. As can be apparent, a sub-frame consisted of 14 consecutive Orthogonal Frequency Division Multiplexing (OFDM) symbols (the length of an OFDM symbol is 1/14 ms) and 12 sub-carriers (the width of a sub-carrier is 15 kHz) includes two slots, and the length of time for each slot is 0.5 ms, where 7 OFDM symbols in the time domain, and 12 sub-carriers in the frequency domain are referred to as a Resource Block (RB), and the RB at the physical layer is also referred to as a RPB. Here the smallest square area as illustrated in FIG. 2 corresponds to 1 OFDM symbol in the time domain, and 1 sub-carrier in the frequency domain, and is referred to as a Resource Element (RE). The number of PRBs in each sub-frame in the time domain depends upon the bandwidth of the system, and for example, there are 100 PRBs corresponding to the bandwidth of the system, which is 20 MHz.

For the sake of a simple discussion, a sub-frame configured with a normal cyclic prefix will be described below, but it shall be noted that the same will apply to a sub-frame with an extended cyclic prefix.

As specified in the existing standard, in a downlink Single User-MIMO (SU-MIMO) transmission process in the Transmission Mode (TM) 10 and the TM 11, the base station allocates some number of transmission data streams for a scheduled UE, and each transmission data stream corresponds to a DMRS port, where each transmission data stream is also referred to as a transport layer.

In order to support spatial multiplexing of at most 8 transmission data streams, there are 8 DMRS ports (the port 7 to the port 14) available in the LTE Rel-10, where the transmission data streams corresponding to the 8 ports are pre-coded, weighted, and mapped onto at least 8 transmit antennas. These DMRS ports can be orthogonal to each other in a code division mode (e.g., using Orthogonal Cover Codes (OCCs)) or a frequency division mode. In a downlink transmission process, the base station can indicate a DMRS configuration scheme via Downlink Control Information (DCI), e.g., DMRS ports allocated for the UE, $n_{SCID}$ indicating DMRS scrambling sequences, etc. In the DMRS patter as illustrated in FIG. 2, the same group of REs among 12 REs in a resource block is multiplexed for the ports 7, 8, 11, and 13 distinguished by OCCs; and another group of REs among 12 other REs in a resource block is multiplexed for the ports 9, 10, 12, and 14 distinguished by OCCs. When the number of transmission data streams of a UE is less than or equal to 2, the DMRS ports 7 and 8 are used, and 12 REs in a resource block are occupied by a DMRS port; and when the number of transmission data streams of a UE is more than 2, more DMRS ports are used, and 24 REs in a resource block are occupied by a DMRS port. The UE can be provided with RE positions, occupied by DMRSs corresponding to the transmission data streams, in a downlink sub-frame according to DMRS configurations of the UE.

In order to enable transparent transmission, and to save an overhead of REs occupied by DMRSs, only the port 7 and the port 8 are used in the MU-MIMO transmission mode in the LTE Rel-10, that is, there are only two OCC-orthogonal DMRSs, and also DMRSs configured for multiple transmission data streams can be distinguished in a pseudo-orthogonal manner (using the same pre-coding/beam-forming as, and different DMRS scrambling sequences from the transmission data streams) When there are only the port 7 and the port 8, the length of an OCC is 2. In the discussion in the 3GPP standard about the earlier technology of Full Dimension-MIMO (FD-MIMO) for a large-scale array of antennas, in order to better support a larger number of users, extended DMRSs have been proposed, and for example, the ports 7, 8, 11, and 13 are used, and the length of an OCC is 4, so that the number of OCC-orthogonal DMRSs is extended to 4.

In a process of downlink scheduling in a PDCCH, the base station can indicate the current number of transmission data streams for the UE, DMRS ports in use, and SCIDs in use jointly using 3 bits in corresponding DCI, and for example, Table 1 depicts a table of antenna ports, scrambling IDs. and the number of data streams indicated by the base station, including a Value of 3 bits, and corresponding DMRS configuration items thereof, where the Value identifies the value of 3-bit DCI, the layer is a transmission data stream, and the Codeword is a channel encoding codeword including a uni-codeword (0) and a dual-codeword (0, 1). Extended DMRSs are added to the technology of FD-MIMO, and also the table indicating the antenna ports, the scrambling IDs, and the number of data streams is extended accordingly.

TABLE 1

Indicated antenna ports, scrambling IDs, and the number of data streams in LTE Rel-10

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

As can be apparent, in the prior art, for a scheduled UE, the base station indicates DMRS allocation schemes corresponding to transmission data streams allocated for the UE, including DMRS ports allocated for the UE, $n_{SCID}$ indicating DMRS scrambling sequences, etc., according to the transmission data streams of the UE while transmitting in the downlink, so that the UE can estimate a DMRS channel correctly. However for a system where there are significantly increased numbers of scheduled UEs, and of transmission data streams, interference between the transmission data streams has become a major bottleneck to an improvement in performance of the system, and channel estimation has become an important factor in maintaining the performance of the system. For example, for interference while multiple data streams are being transmitted, the performance of detection in an Interference Rejection Combining (IRC) receiver using an interference rejection algorithm may be degraded due to inaccurate estimation of an interference covariance matrix. In the prior art, in the case that only DMRS configurations corresponding to transmission data streams of a UE are indicated to the UE, the UE can not be provided with all the information about DMRSs corresponding to the other data streams transmitted at the same time as the transmission data streams of the UE. For an MU-MIMO system with a large-scale array of antennas, there are an significantly increased number of concurrently transmitted data streams therein, so although there is a high interference rejection capability of the large-scale array of antennas, the number of concurrently scheduled transmission data streams is far more than that in the existing LTE system, so the UE tends to fail to estimate a channel accurately in the case that it is only provided with the DMRS allocation schemes corresponding to the transmission data streams of the UE, thus degrading the performance of detection in the receiver at the UE side, and thus the performance of the system as a whole.

In order to indicate a DMRS while multiple data streams are being transmitted, embodiments of the invention provides a method for indicating a DMRS, a UE, and a base station, and the embodiments of the invention are optionally applicable to an MU-MIMO system with a large-scale array of antennas. The embodiments of the invention will be described below in details with reference to the drawings.

Figure 3:
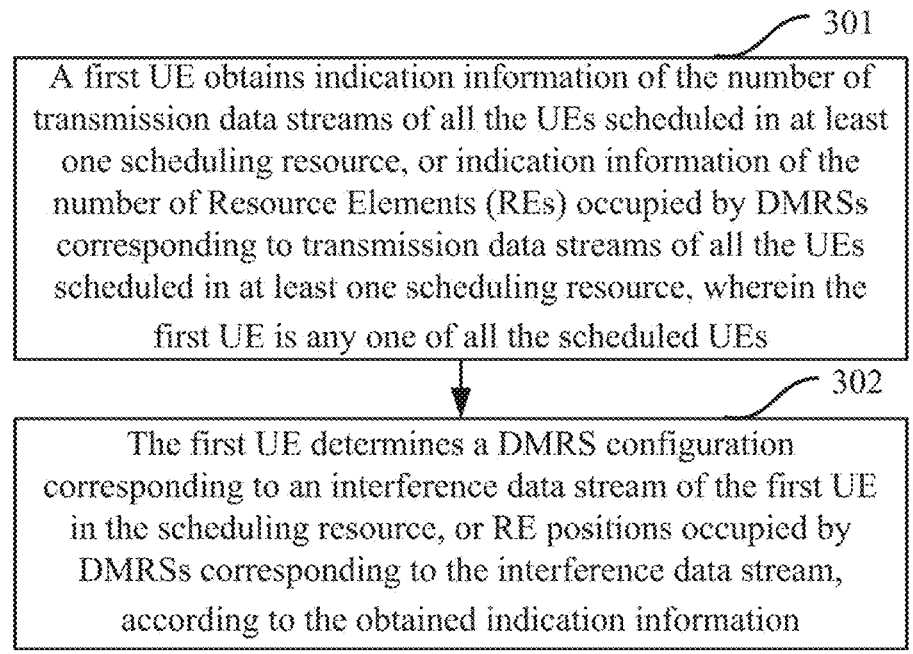
FIG. 3 is a schematic flow chart of a method for indicating a DRMS according to an embodiment of the invention.

FIG. 3 illustrates a schematic flow chart of a method for indicating a DMRS according to an embodiment of the invention, and the flow can be performed by a UE, where in order to describe the method according to the embodiment of the invention more clearly, one of all the scheduled UEs will be referred to as a "first UE" in the following description. The flow includes the following steps.

In the step 301, a first UE obtains indication information of the number of transmission data streams of all the UEs scheduled in at least one scheduling resource, or indication information of the number of Resource Elements (REs) occupied by DMRSs corresponding to transmission data streams of all the UEs scheduled in at least one scheduling resource, where the first UE is any one of all the scheduled UEs.

In the step 302, the first UE determines a DMRS configuration corresponding to an interference data stream of the first UE in the scheduling resource, or RE positions occupied by DMRSs corresponding to the interference data stream, according to the indication information obtained in the step 301.

By way of an example in which the flow above is applied to an MU-MIMO system with a large-scale array of antennas, the first UE obtains indication information of the number of transmission data streams of all the UEs (typically two or more UEs) scheduled in at least one scheduling resource, or indication information of the number of REs occupied by DMRSs corresponding to transmission data streams of all the UEs (typically two or more UEs) scheduled in at least one scheduling resource.

For a scheduling resource, the first UE can obtain the number of transmission data streams of all the UEs scheduled in the scheduling resource according to the obtained indication information; or for a scheduling resource, the first UE can obtain the indication information of the number of REs occupied by DMRSs corresponding to transmission data streams of all the UEs scheduled in the scheduling resource according to the obtained indication information.

Here for a scheduling resource, the indication information of the number of REs occupied by DMRSs corresponding to transmission data streams of all the UEs scheduled in the scheduling resource can be indication information of the number of REs occupied in a specific time-frequency resource by DMRSs corresponding to transmission data streams of all the UEs scheduled in the scheduling resource, where the specific time-frequency resource can include one or more PRBs in the scheduling resource.

Optionally for a scheduling resource, the indication information of the number of REs occupied by DMRSs corresponding to transmission data streams of all the UEs scheduled in the scheduling resource can be indication information of the number of REs occupied in a PRB in the scheduling resource by DMRSs corresponding to transmission data streams of all the UEs scheduled in the scheduling resource.

Optionally for the flow of the method for indicating a DMRS including the step 301 and the step 302 as illustrated in FIG. 3, there may be the following schemes thereof without any limitation thereto.

First Scheme.

In the step 301, the first UE obtains the indication information of the number of transmission data streams of all the UEs scheduled in at least one scheduling resource; and in the step 302, the first UE determines the DMRS configuration corresponding to the interference data stream of the first UE in the scheduling resource according to the obtained indication information of the number of transmission data streams of all the UEs scheduled in at least one scheduling resource.

Here the base station schedules UEs according to channel conditions, service characteristics, priorities, and other factors of the respective scheduled UEs, and allocates some number of transmission data streams for each scheduled UE, where each transmission data stream corresponds to a DMRS port, and the numbers of transmission data streams corresponding to the respective scheduled UEs may or may not be the same. For a scheduling resource, the number of transmission data streams of all the scheduled UEs represents the sum of the numbers of transmission data streams of all the scheduled UEs.

Optionally the first UE can receive indication information, of the number of transmission data streams of all the UEs scheduled in one or more scheduling resources, transmitted by a base station.

Here the indication information of the number of transmission data streams of all the UEs scheduled in one or more scheduling resources can be transmitted via the following signaling: DCI or Radio Resource Control (RRC) signaling.

In some Optional embodiment, the indication information can be DCI in a common search space.

Here both uplink and downlink resource scheduling information (e.g., DCI) in LTE can be carried by a PDCCH, and the PDCCH can carry DCI from the base station to one or more UEs. An information carrying area of the PDCCH is divided into common control information (a common search space) and dedicated control information (a dedicated search space) dependent upon different operating domains thereof. The DCI carried in the PDCCH can include resource allocation and other control information on one or more scheduled UEs. For a scheduled UE, it firstly demodulates the DCI, and then can demodulate its own PDSCH at corresponding resource positions, so if the DCI in the common search space indicates the number of transmission data streams of the scheduled UEs, then any one of the scheduled UEs may demodulate the DCI in the common search space for the indication information of the number of transmission data streams.

Since the base station schedules the UEs in each scheduling resource, there may be different UEs scheduled in each scheduling resource, and also there may be different numbers of transmission data streams of the respective scheduled UEs, so for each scheduling resource, the number of transmission data streams of the UEs scheduled in each scheduling resource can be indicated respectively, and by way of an example in which DCI in the common search space indicates the number of transmission data streams of all the scheduled UEs, the first UE demodulates the DCI in the common search space corresponding to each scheduling resource transmitted by the base station upon reception of each scheduling resource, so that the first UE obtains one by one for each scheduling resource the indication information of the number of transmission data streams of all the UEs scheduled in the scheduling resource.

Optionally in order to lower a signaling overhead, for a plurality of scheduling resources, the number of transmission data streams of all the UEs scheduled in the plurality of scheduling resources can be indicated in one of the scheduling resources through joint encoding, and by way of an example in which DCI in the common search space indicates the number of transmission data streams of all the scheduled UEs, indication information of the number of transmission data streams of all the UEs scheduled in several scheduling resources is included in one of the scheduling resources transmitted by the base station. The first UE decodes the DCI in the common search space corresponding to the scheduling resource upon reception of the scheduling resource, so that the first UE obtains the indication information of the number of transmission data streams of all the UEs scheduled in the scheduling resource and the other scheduling resources.

Furthermore the first UE can firstly obtain a correspondence relationship between the number of transmission data streams, and a set of DMRS configurations after obtaining the indication information of the number of transmission data streams of all the UEs scheduled in the at least one scheduling resource, where a value of the number of transmission data streams corresponds uniquely to a set of DMRS configurations; the first UE further obtains a set of DMRS configurations corresponding to the number of transmission data streams of all the UEs scheduled in the scheduling resource according to the obtained indication information of the number of transmission data streams of all the UEs scheduled in the at least one scheduling resource, and correspondence relationship between the number of transmission data streams, and a set of DMRS configurations; and the first UE finally determines the DMRS configuration corresponding to the interference data stream of the first UE in the scheduling resource according to the obtained set of DMRS configurations, and DMRS configurations corresponding to transmission data streams of the first UE.

Optionally the correspondence relationship between the number of transmission data streams, and a set of DMRS configurations is configured by the base station to the first UE; or the correspondence relationship between the number of transmission data streams, and a set of DMRS configurations is agreed on in advance between the base station and the first UE. In some optional embodiment, the correspondence relationship between the number of transmission data streams, and a set of DMRS configurations can be represented as a mapping table, etc.

Here the first UE can obtain the DMRS configurations corresponding to the transmission data streams of the first UE as in the prior art, and for example, according to DCI, corresponding to each scheduled UE, transmitted by the base station, where the DCI corresponding to a scheduled UE includes several bits indicating DMRS configurations corresponding to transmission data streams of the scheduled UE. Optionally each of transmission data streams of each scheduled UE corresponds to a DMRS configuration, and a DMRS configuration corresponding to a transmission data stream can include DMRS ports, DMRS scrambling IDs (e.g., $n_{SCID}$), the number of REs occupied by DMRSs, etc., and with the DMRS configuration, the first UE can also obtain RE positions occupied by DMRSs corresponding to each of the transmission data steams of the first UE.

In some optional embodiment, the eNB performing downlink scheduling in a PDCCH can indicate for a scheduling resource the number of transmission data streams of all the scheduled UEs in several bits in the DCI or RRC signaling of the common search space, and can allocate the bits according to the supported largest number of data streams (e.g., allocate at least 5 bits for at most supported 32 transmission data streams at the same time and frequency); and can indicate DMRS configurations of each scheduled UE in several bits in DCI corresponding to each scheduled UE, and for example, indicate the current number of transport layers, DMRS ports in use, SCIDs in use, and other information of each UE jointly in 3 or more bits.

In some embodiment, for example, signaling for a plurality of UEs (e.g., N UEs including a UE 1, a UE 2, . . . , and a UE N) scheduled in a scheduling resource can be designed as including (for example, the number of transmission data streams of the N UEs scheduled in the scheduling resource is M): the number M of transmission data streams, e.g., signaled in DCI or RRC signaling, in the common search space, which can be read by all the UEs; DMRS configurations corresponding to transmission data streams of the UE 1, which are signaled in DCI corresponding to the UE 1; DMRS configurations corresponding to transmission data streams of the UE 2, which are signaled in DCI corresponding to the UE 2; . . . , and DMRS configurations corresponding to transmission data streams of the UE N, which are signaled in DCI corresponding to the UE N. In this way, any one of the scheduled UEs (the first UE) can obtain: the number M of transmission data streams of all the UEs (N UEs) scheduled in the current scheduling resource, and DMRS configurations corresponding to transmission data streams of the UE.

Since each of transmission data streams corresponding to each scheduled UE corresponds to a DRMS configuration, the eNB allocating corresponding DMRSs for transmission data streams of each scheduled UE can distinguish the DMRSs allocated for the transmission data streams in a pseudo-orthogonal manner (using the same pre-coding/beam-forming as, and different DMRS scrambling sequences from the transmission data streams), so a value of the number of transmission data streams of all the scheduled UEs can correspond uniquely to a set of DMRS configurations.

Taking a scheduling resource as an example, the first UE obtaining the indication information of the number of transmission data streams of all the UEs scheduled in the scheduling resource can obtain a set of DMRS configurations corresponding to the number of transmission data streams of all the UEs scheduled in the scheduling resource according to the indication information of the number of transmission data streams of all the UEs scheduled in the scheduling resource, and the correspondence relationship between the number of transmission data streams, and a set of DMRS configurations; and the first UE can determine the DMRS configuration corresponding to the interference data stream of the UE in the scheduling resource according to the obtained set of DMRS configurations, and the DMRS configurations corresponding to the transmission data streams of the first UE.

By way of an example in which the first UE can obtain the correspondence relationship, between the number of transmission data streams, and a set of DMRS configurations, agreed on in advance with the base station, the correspondence relationship between the number of transmission data streams, and a set of DMRS configurations is represented as a mapping table, where each row in the table can represents each value of the number of transmission data streams, and a set of DMRS configurations corresponding thereto, and the set of DMRS configurations includes DMRS ports, DMRS scrambling IDs (e.g., $n_{SCID}$), the number of REs occupied by DMRSs, etc., at that value. For example, a mapping table of sets of DMRS configurations for at most supported 16 transmission data streams can be as depicted in Table 2.

TABLE 2

An example of the correspondence relationship between the number of transmission data streams, and a set of DMRS configurations (a mapping table of sets of DMRS configurations for at most supported 16 transmission data streams)

| The number of streams | Port No. | $n_{SCID}$ | The number of REs (in an RB) occupied by DMRSs |
|---|---|---|---|
| 1 | 7 | 0 | 12 |
| 2 | 7, 8 | 0 | 12 |
| 3 | 7, 8, 11 | 0 | 12 |
| 4 | 7, 8, 11, 13 | 0 | 12 |
| 5 | 7, 8, 11, 13, 9 | 0 | 24 |
| 6 | 7, 8, 11, 13, 9, 10 | 0 | 24 |
| 7 | 7, 8, 11, 13, 9, 10, 12 | 0 | 24 |
| 8 | 7, 8, 11, 13, 9, 10, 12, 14 | 0 | 24 |
| 9 | 7, 8, 11, 13, 9, 10, 12, 14 7 | 0 1 | 24 |
| 10 | 7, 8, 11, 13, 9, 10, 12, 14 7, 8 | 0 1 | 24 |
| 11 | 7, 8, 11, 13, 9, 10, 12, 14 7, 8, 11 | 0 1 | 24 |
| 12 | 7, 8, 11, 13, 9, 10, 12, 14 7, 8, 11, 13 | 0 1 | 24 |
| 13 | 7, 8, 11, 13, 9, 10, 12, 14 7, 8, 11, 13, 9 | 0 1 | 24 |
| 14 | 7, 8, 11, 13, 9, 10, 12, 14 7, 8, 11, 13, 9, 10 | 0 1 | 24 |
| 15 | 7, 8, 11, 13, 9, 10, 12, 14 7, 8, 11, 13, 9, 10, 12 | 0 1 | 24 |
| 16 | 7, 8, 11, 13, 9, 10, 12, 14 7, 8, 11, 13, 9, 10, 12, 14 | 0 1 | 24 |

By way of an example, the first UE is configured thereon with the mapping table of the correspondence relationship between the number of transmission data streams, and a set of DMRS configurations as depicted in Table 2.

For a scheduling resource, the first UE firstly obtains the number of transmission data streams of all the UEs scheduled in the scheduling resource, and for example, can obtain it according to the indication information of the number of transmission data streams of all the UEs scheduled in the scheduling resource; and for example, the obtained number of transmission data streams of all the UEs scheduled in the scheduling resource is 10, and the first UE can refer to the mapping table (Table 2), configured on the UE, of the correspondence relationship between the number of transmission data streams, and a set of DMRS configurations using the number (10) of transmission data streams of all the UEs scheduled in the scheduling resource, and obtain a set of DMRS configurations corresponding to the number (10) of transmission data streams as {(7,0), (8,0), (11,0), (13,0), (9,0), (10,0), (12,0), (14,0), (7,1), (8,1)}, where an element (a, b) in the set represents a pair of a port number and a scrambling ID, where a represents a port number, and b represents a scrambling ID, e.g., $n_{SCID}$.

The first UE obtains the DMRS configurations corresponding to its transmission data streams according to the DCI corresponding thereto, and for example, the DMRS configurations corresponding to the transmission data streams corresponding to the first UE are {(11,0), (13,0)}, and the number of transmission data streams is 2.

The first UE can determine the DMRS configuration corresponding to the interference data stream of the UE in the scheduling resource as {(7,0), (8,0), (9,0), (10,0), (12,0), (14,0), (7,1), (8,1)} according to the obtained set of DMRS configurations {(7,0), (8,0), (11,0), (13,0), (9,0), (10,0), (12,0), (14,0), (7,1), (8,1)}, and DMRS configurations corresponding thereto {(11,0), (13,0)}.

Furthermore as described in the first schedule, the first UE can further determine the RE positions occupied by the DMRSs corresponding to the interference data stream of the first UE in the scheduling resource according to the obtained indication information of the number of transmission data streams of all the UEs scheduled in the at least one scheduling resource. Optionally after the first UE obtains the indication information of the number of transmission data streams of all the UEs scheduled in the at least one scheduling resource, the first UE can firstly obtain the correspondence relationship between the number of transmission data streams, and a set of DMRS configurations; further obtain the set of DMRS configurations corresponding to the number of transmission data streams of all the UEs scheduled in the scheduling resource according to the obtained indication information of the number of transmission data streams of all the UEs scheduled in the at least one scheduling resource; and finally determine the RE positions occupied by the DMRSs corresponding to the interference data stream of the first UE in the scheduling resource according to the obtained set of DMRS configurations. By way of an example, the correspondence relationship between the number of transmission data streams, and a set of DMRS configurations as depicted in Table 2 can be simplified into Table 3.

TABLE 3

An example of a simplified correspondence relationship between the number of transmission data streams, and a set of DMRS configurations (including sets of DMRS configurations for at most supported 16 transmission data streams)

| The number of streams | The number of REs (in an RB) occupied by DMRSs |
|---|---|
| 1, 2, 3, 4 | 12 |
| 5, 6, 7, 8, 9, 10, 11, 12, 13, 14, 15, 16 | 24 |

Here the first UE can obtain the set of DMRS configurations corresponding to the number of transmission data streams of all the UEs scheduled in the scheduling resource (that is, the number of REs, in an RB, occupied by DMRSs is 24) according to the indication information of the number (e.g., 10) of transmission data streams of all the UEs scheduled in the scheduling resource; and finally determine RE positions possibly occupied by the DMRSs corresponding to the interference data stream of the first UE in the scheduling resource according to the obtained set of DMRS configurations (that is, the number of REs, in an RB, occupied by DMRSs is 24) (for example, for the DMRS pattern as illustrated in FIG. 2, the RE positions possibly occupied by the DMRSs corresponding to the interference data stream are the same group of REs multiplexed for the ports 7, 8, 11, and 13, and another group of REs multiplexed for the ports 9, 10, 12, and 14).

As can be apparent, with the first scheme, any one of scheduled UEs in a scheduling resource (the first UE) can know: the number of transmission data streams of all the currently scheduled UEs, the set of DMRS configurations corresponding to the number of transmission data streams of all the currently scheduled UEs, the DMRS configurations corresponding to the transmission data streams of the first UE, and the DMRS configuration, corresponding to the interference data stream of the first UE, obtained according to the information above. With the first scheme, any one of the scheduled UEs (the first UE) can estimate a channel of the interference data stream according to the DMRS configuration corresponding to the interference data stream in addition to estimating channels of the transmission data streams thereof according to the DMRS configurations corresponding to the transmission data streams thereof.

Second Scheme.

In the step 301, the first UE obtains the indication information of the number of REs occupied by the DMRSs corresponding to transmission data streams of all the UEs scheduled in at least one scheduling resource; and in the step 302, the first UE determines the RE positions occupied by the DMRSs corresponding to the interference data stream of the first UE in the scheduling resource according to the obtained indication information of the number of REs occupied by the DMRSs corresponding to the transmission data streams of all the UEs scheduled in the at least one scheduling resource.

Optionally as described above, for a scheduling resource, the indication information of the number of REs occupied by the DMRSs corresponding to the transmission data streams of all the UEs scheduled in the scheduling resource can be indication information of the number of REs occupied in a specific time-frequency resource by the DMRSs corresponding to the transmission data streams of all the UEs scheduled in the scheduling resource, where the specific time-frequency resource can include one or more PRBs in the scheduling resource.

For the sake of a convenient description, for example, the number of REs occupied by DMRSs corresponding to transmission data streams of all the UEs in a scheduling resource will be described below as the number of REs occupied in a PRB in a scheduling resource by DMRSs corresponding to transmission data streams of all the UEs scheduled in the scheduling resource, and it shall be appreciated that for a scheduling resource, there are the same number of REs occupied in each PRB in the scheduling resource by DMRSs corresponding to transmission data streams of all the UEs scheduled in the scheduling resource, and the number of PRBs in a scheduling resource depends upon a bandwidth.

Here the base station schedules UEs according to channel conditions, service characteristics, priorities, and other factors of the respective scheduled UEs, and allocates some number of transmission data streams for each scheduled UE, where each transmission data stream corresponds to a DMRS port. There are 8 DMRS ports (the port 7 to the port 14) available in the LTE Rel-10, and these DMRS ports can be orthogonal to each other in a code division mode (e.g., using OCCs) or a frequency division mode. When the number of transmission data streams of a scheduled UE is less than or equal to 2, the DMRS ports 7 and 8 can be used, and 12 REs in a resource block (PRB) are occupied by a DMRS port; and when the number of transmission data streams of a scheduled UE is more than 2, more DMRS ports can be used, and 24 REs in a resource block (PRB) are occupied by a DMRS port.

For the DMRS pattern as illustrated in FIG. 2, the same group of REs among 12 REs in a resource block (PRB) is multiplexed for the ports 7, 8, 11, and 13 distinguished by OCCs; and another group of REs among 12 other REs in a resource block (PRB) is multiplexed for the ports 9, 10, 12, and 14 distinguished by OCCs, so for a scheduling resource, the number of REs occupied in a PRB by DMRSs corresponding to transmission data streams of all the UEs scheduled in the scheduling resource can reflect RE positions occupied in the PRB by the DMRSs corresponding to the transmission data streams of all the UEs scheduled in the scheduling resource; and furthermore since there are the same number of REs occupied in each PRB in a scheduling resource by DMRSs corresponding to transmission data streams of all the UEs scheduled in the scheduling resource, RE positions occupied by the DMRSs corresponding to the transmission data streams of all the UEs scheduled in the scheduling resource. Taking the DMRS pattern as illustrated in FIG. 2 as an example, when the value of the number of REs occupied by DMRS ports is 12, there are corresponding RE positions occupied by one or more of the port 7, the port 8, the port 11, and the port 13, or corresponding RE positions occupied by one or more of the port 9, the port 10, the port 12, and the port 14; and when the value of the number of REs occupied by DMRS ports is 24, there are corresponding RE positions occupied by one or more of the port 7, the port 8, the port 11, and the port 13, or one or more of the port 9, the port 10, the port 12, and the port 14.

Optionally the first UE can receive indication information, of the number of REs occupied by DMRSs corresponding to transmission data streams of all the UEs scheduled in one or more scheduling resources, transmitted by a base station.

Here the indication information of the number of REs occupied by DMRSs corresponding to transmission data streams of all the UEs scheduled in one or more scheduling resources can be transmitted via DCI or RRC signaling.

In some optional embodiment, the indication information can be DCI in a common search space.

Here the indication information, of the number of REs occupied by the DMRSs corresponding to the transmission data streams of all the UEs scheduled in the at least one scheduling resource, transmitted by the eNB can be similar to the indication information, of the number of transmission data streams of all the UEs scheduled in the at least one scheduling resource, transmitted by the base station as described in the first scheme, so the number of REs occupied by DMRSs corresponding to transmission data streams of all the UEs scheduled in a plurality of scheduling resources can also be indicated in one of the scheduling resources through joint encoding as information about the numbers of REs occupied by DMRSs corresponding to transmission data streams of all the scheduled UEs corresponding respectively to the plurality of scheduling resources. For a scheduling resource, the number of REs occupied by DMRSs corresponding to transmission data streams of all the scheduled UEs can be indicated in several bits in the DCI or RRC signaling of the common search space, and optionally the bits can be allocated according to all the possible instances of the number of occupied REs (for example, at least 1 bit is allocated for 12 or 24 REs occupied in a PRB).

In some optional embodiment, for example, signaling for a plurality of UEs (e.g., N UEs including a UE 1, a UE 2, . . . , and a UE N) scheduled in a scheduling resource can be designed as including (for example, the number of REs occupied in a PRB by DMRSs corresponding to transmission data streams of all the UEs scheduled in the scheduling resource is M): the number M of REs occupied in a PRB by DMRSs corresponding to transmission data streams of all the UEs scheduled in the scheduling resource, e.g., signaled in DCI or RRC signaling, in the common search space, which can be read by all the UEs; DMRS configurations corresponding to transmission data streams of the UE 1, which are signaled in DCI corresponding to the UE 1; DMRS configurations corresponding to transmission data streams of the UE 2, which are signaled in DCI corresponding to the UE 2; . . . ; and DMRS configurations corresponding to transmission data streams of the UE N, which are signaled in DCI corresponding to the UE N. In this way, any one of the scheduled UEs (the first UE) can obtain: the number M of REs occupied by DMRSs corresponding to transmission data streams of all the UEs scheduled in the current scheduling resource, and DMRS configurations corresponding to transmission data streams of the UE.

Furthermore the first UE obtaining the indication information of the number of REs occupied by the DMRSs corresponding to the transmission data streams of all the UEs scheduled in the at least one scheduling resource can determine the RE positions occupied by the DMRSs corresponding to the transmission data streams of all the UEs scheduled in the scheduling resource according to the obtained indication information of the number of REs occupied by the DMRSs corresponding to the transmission data streams of all the UEs scheduled in the at least one scheduling resource; and determine the RE positions occupied by the DMRSs corresponding to the interference data stream of the first UE in the scheduling resource according to the RE positions occupied by the DMRSs corresponding to the transmission data streams of all the UEs scheduled in the scheduling resource, where the determined RE positions occupied by the DMRSs corresponding to the interference data stream are located among the RE positions occupied by the DMRSs corresponding to the transmission data streams of all the scheduled UEs.

Optionally in some embodiments, taking a scheduling resource as an example, the value of the number of REs occupied in an RB by DMRSs corresponding to transmission data streams of all the scheduled UEs can be 12 or 24, and based upon the DMRS pattern as illustrated in FIG. 2, when the value is 12, RE positions occupied by the DMRSs corresponding to the transmission data streams of all the scheduled UEs can be the same group of REs multiplexed for the ports 7, 8, 11, and 13 in the DMRS pattern as illustrated in FIG. 2, or another group of REs multiplexed for the ports 9, 10, 12, and 14; and when the value is 24. RE positions occupied by the DMRSs corresponding to the transmission data streams of all the scheduled UEs can be the same group of REs multiplexed for the ports 7, 8, 11, and 13 in the DMRS pattern, and another group of REs multiplexed for the ports 9, 10, 12, and 14, as illustrated in FIG. 2, optionally as depicted in Table 4, where as discussed in LTE about FD-MIMO, the base station configuring the UE with DMRSs firstly allocates the port 7, the port 8, the port 11, and the port 13, and further allocates one or more of the port 9, the port 10, the port 12, and the port 14 for use, in the case that there is a need of additional ports for a larger amount of data in data streams to be transmitted, so the instance 1 and the instance 3 as depicted in Table 4 occur frequently, and the instance 2 may not occur in the existing protocol.

TABLE 4

Possible instances of the number of occupied REs, and occupied RE positions

| | The number of REs occupied by DMRSs corresponding to all the transmission data streams | RE positions occupied by DMRSs corresponding to all the transmission data streams |
| --- | --- | --- |
| Instance 1 | 12 | 12 REs occupied by ports 7 (8, 11, 13) |
| Instance 2 | 12 | 12 REs occupied by ports (0, 12, 14) |
| Instance 3 | 24 | 24 REs occupied by ports 7 (8, 11, 13) and 9 (10, 12, 14) |

Furthermore as described in the second schedule, the first UE can further determine the DMRS configuration corresponding to the interference data stream of the first UE in the scheduling resource according to the obtained indication information of the number of REs occupied by the DMRSs corresponding to the transmission data streams of all the UEs scheduled in the at least one scheduling resource. Optionally after the first UE obtains the indication information of the number of REs occupied by the DMRSs corresponding to the transmission data streams of all the UEs scheduled in the at least one scheduling resource, the first UE can determine the RE positions occupied by the DMRSs corresponding to the transmission data streams of all the UEs scheduled in the scheduling resource according to the obtained indication information of the number of REs occupied by the DMRSs corresponding to the transmission data streams of all the UEs scheduled in the at least one scheduling resource; and further determine the DMRS configuration corresponding to the interference data stream of the first UE in the scheduling resource according to the determined RE positions occupied by the DMRSs corresponding to the transmission data streams of all the UEs scheduled in the scheduling resource. By way of an example, as per the principle in Table 4 and the prior art that the ports are allocated by firstly using the port 7, the port 8, the port 11, and the port 13, for a scheduling resource, when, the number obtained by the first UE, of REs occupied by DMRSs corresponding to transmission data streams of all the UEs scheduled in the scheduling resource is indicated as 12, it can be determined that a DMRS port, corresponding to an interference data stream of the first UE in the scheduling resource, in a DMRS configuration corresponding to the interference data stream lies in the range of the port 7, the port 8, the port 11, and the port 13.

As can be apparent, with the second scheme, any one of scheduled UEs in a scheduling resource (the first UE) can know: the number of REs occupied by DMRSs corresponding to transmission data streams of all the UEs currently scheduled in the scheduling resource, and RE positions occupied by DMRSs corresponding to an interference data stream of the UE, where the determined RE positions occupied by the DMRSs corresponding to the interference data stream lie among RE positions occupied by the DMRSs corresponding to the transmission data streams of all the scheduled UEs.

Optionally after the first UE determines the DRMS configuration corresponding to, or the RE positions occupied by the interference data stream of the first UE, the first UE can further estimate an interference covariance matrix for the interference data stream of the first UE according to the determined DRMS configuration corresponding to the interference data stream of the first UE, or RE positions occupied by DMRSs corresponding to the interference data stream. For example, for an IRC receiver using an interference rejection algorithm, an interference covariance matrix can be estimated for the interference data stream of the first UE according to the determined DRMS configuration corresponding to the interference data stream of the first UE, or RE positions occupied by DMRSs corresponding to the interference data stream to thereby improve the accuracy of interference estimation, enhance the performance of detection in the receiver, improve the quality of receiving a signal, and significantly improve the performance of reception at a user optionally in the case that multiple data streams are being transmitted.

An embodiment of the invention further provides a method for indicating a DMRS. A method for indicating a DMRS according to an embodiment of the invention can be performed by a base station as follows: the base station transmits indication information of the number of transmission data streams of all the UEs scheduled in at least one scheduling resource, or indication information of the number of REs occupied by DMRSs corresponding to transmission data streams of all the UEs scheduled in at least one scheduling resource to a first UE, where the first UE is any one of all the scheduled terminals, and the indication information is used by the first terminal to determine a DMRS configuration corresponding to an interference data stream of the first UE in the scheduling resource, or RE positions occupied by DMRSs corresponding to the interference data stream.

Optionally the base station can transmit DCI or RRC signaling to the first UE, where the DCI or RRC signaling indicates to the first UE the number of transmission data streams of all the UEs scheduled in the at least one scheduling resource, or the number of REs occupied by the DMRSs corresponding to the transmission data streams of all the UEs scheduled in the at least one scheduling resource.

Here the base station can further configure a correspondence relationship between the number of transmission data streams to the first UE, where a value of the number of transmission data streams corresponds uniquely to a set of DMRS configurations; or the correspondence relationship between the number of transmission data streams, and a set of DMRS configurations is agreed on in advance between the base station and the first UE.

As can be apparent from the description above, in the method for indicating a DMRS according to the embodiment of the invention, the first UE firstly obtains the indication information of the number of transmission data streams of all the UEs scheduled in at least one scheduling resource, or the indication information of the number of REs occupied by DMRSs corresponding to transmission data streams of all the UEs scheduled in at least one scheduling resource to a first UE, where the first UE is any one of all the scheduled terminals; and the first UE further determines a DMRS configuration corresponding to an interference data stream of the first UE in the scheduling resource, or RE positions occupied by DMRSs corresponding to the interference data stream according to the indication information. As can be apparent from the description above, in the method for indicating a DMRS according to the embodiment of the invention, the UE can determine the DMRS configuration corresponding to the interference data stream of the UE in the scheduling resource, or the RE positions occupied by the DMRSs corresponding to the interference data stream. As compared with the prior art in which the terminal can only obtain allocated DMRSs corresponding to transmission data steams of the UE, in the method for indicating a DMRS according to the embodiment of the invention, the UE can further determine the DMRS configuration corresponding to the interference data stream, or the RE positions occupied by the DMRSs corresponding to the interference data stream to thereby estimate an interference covariance matrix so as to improve the accuracy of channel estimation, and achieve a better effect of channel estimation optionally in the case that multiple data streams are being transmitted, thus guaranteeing the performance of detection in the receiver at the UE side, and the performance of the system as a whole.

Figure 4:
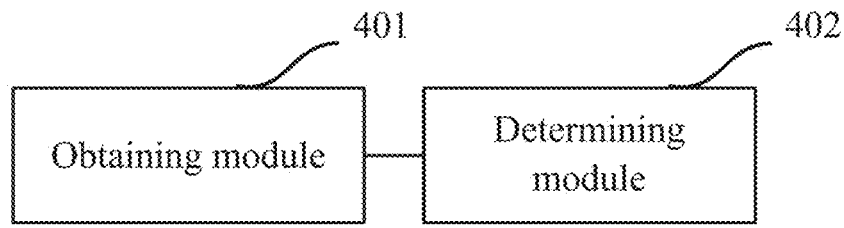
FIG. 4 is a schematic structural diagram of a UE according to an embodiment of the invention.

An embodiment of the invention further provides a UE, which can implement the embodiment of the method for indicating a DMRS at the UE side as described above. As illustrated in FIG. 4, the UE according to the embodiment of the invention can include an obtaining module 401 and a determining module 402, where the term "module" can be a combination of software and/or hardware to perform a predetermined function. The structure of the UE according to the embodiment of the invention will be described below in details.

The obtaining module 401 is configured to obtain indication information of the number of transmission data streams of all the UEs scheduled in at least one scheduling resource, or indication information of the number of Resource Elements (REs) occupied by DMRSs corresponding to transmission data streams of all the UEs scheduled in at least one scheduling resource.

The determining module 402 is configured to determine a DMRS configuration corresponding to an interference data stream of the UE in the scheduling resource, or RE positions occupied by DMRSs corresponding to the interference data stream according to the obtained indication information.

Here the determining module 402 is configured to obtain a correspondence relationship between the number of transmission data streams, and a set of DMRS configurations, where a value of the number of transmission data streams corresponds uniquely to a set of DMRS configurations; to obtain a set of DMRS configurations corresponding to the number of transmission data streams of all the UEs scheduled in the scheduling resource according to the obtained indication information of the number of transmission data streams of all the UEs scheduled in the at least one scheduling resource, and correspondence relationship between the number of transmission data streams, and a set of DMRS configurations; and to determine the DMRS configuration corresponding to the interference data stream of the UE in the scheduling resource according to the obtained set of DMRS configurations, and DMRS configurations corresponding to transmission data streams of the UE.

Here the correspondence relationship between the number of transmission data streams, and a set of DMRS configurations is configured by the base station to the UE; or the correspondence relationship between the number of transmission data streams, and a set of DMRS configurations is agreed on in advance between the base station and the UE.

Here the determining module 402 is configured; to determine RE positions occupied by the DMRSs corresponding to the transmission data streams of all the UEs scheduled in the scheduling resource according to the obtained indication information of the number of REs occupied by the DMRSs corresponding to the transmission data streams of all the UEs scheduled in the at least one scheduling resource; and to determine the RE positions occupied by the DMRSs corresponding to the interference data stream of the UE in the scheduling resource according to the RE positions occupied by the DMRSs corresponding to the transmission data streams of all the UEs scheduled in the scheduling resource, where the determined RE positions occupied by the DMRSs corresponding to the interference data stream are located among the RE positions occupied by the DMRSs corresponding to the transmission data streams of all the scheduled UEs.

Here the indication information is transmitted via the following signaling: Downlink Control Information (DCI) or Radio Resource Control (RRC) signaling.

Optionally the Downlink Control Information (DCI) is DCI in a common search space.

Figure 5:
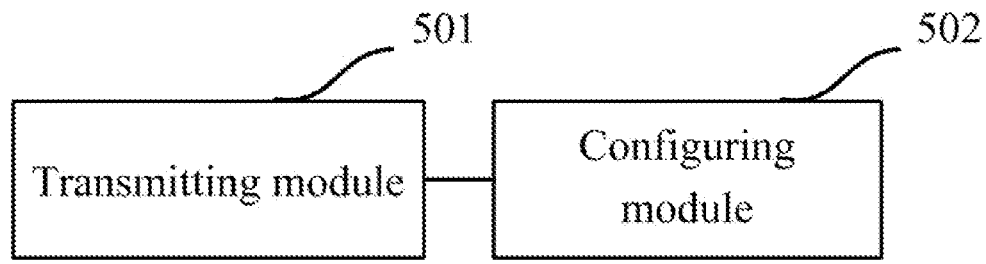
FIG. 5 is a schematic structural diagram of a base station according to an embodiment of the invention.

An embodiment of the invention further provides a base station, which can implement the embodiment of the method for indicating a DMRS resource at the base station side as described above. As illustrated in FIG. 5, the base station according to the embodiment of the invention can include: a transmitting module 501 configured to transmit indication information of the number of transmission data streams of all the UEs scheduled in at least one scheduling resource, or indication information of the number of REs occupied by DMRSs corresponding to transmission data streams of all the UEs scheduled in at least one scheduling resource to a first UE, where the first UE is any one of all the scheduled terminals, and the indication information is used by the first terminal to determine a DMRS configuration corresponding to an interference data stream of the first UE in the scheduling resource, or RE positions occupied by DMRSs corresponding to the interference data stream.

Here the term "module" can be a combination of software and/or hardware to perform a predetermined function. The structure of the base station according to the embodiment of the invention will be described below in details.

Optionally the transmitting module 501 can transmit DCI or RRC signaling to the first UE, where the DCI or RRC signaling indicates to the first UE the number of transmission data streams of all the UEs scheduled in the at least one scheduling resource, or the number of REs occupied by the DMRSs corresponding to the transmission data streams of all the UEs scheduled in the at least one scheduling resource.

The base station according to the embodiment of the invention can further include a configuring module 601 configured to configure a correspondence relationship between the number of transmission data streams to the first UE, where a value of the number of transmission data streams corresponds uniquely to a set of DMRS configurations; or the correspondence relationship between the number of transmission data streams, and a set of DMRS configurations is agreed on in advance between the base station and the first UE.

Based upon the same technical idea, an embodiment of the invention further provides a UE, which can perform the flow of the method for indicating a DMRS at the UE side as described in the embodiment above.

Figure 6:
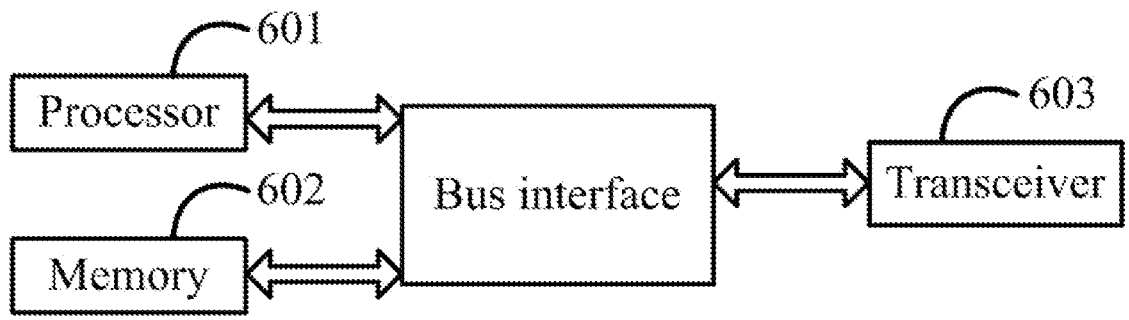
FIG. 6 is a schematic structural diagram of a UE according to an embodiment of the invention.

Referring to FIG. 6 illustrating a schematic structural diagram of a UE according to an embodiment of the invention, the UE can include a processor 601, a memory 602, a transceiver 603, and a bus interface.

The processor 601 is responsible for managing a bus architecture and performing normal processes, and the memory 602 can store data for use by the processor 601 in performing operations. The transceiver 603 is configured to be controlled by the processor 601 to receive and transmit data.

The bus architecture can include any number of interconnecting buses and bridges to optionally link together various circuits including one or more processors represented by the processor 601, and one or more memories represented by the memory 602. The bus architecture can further link together various other circuits, e.g., prophetical devices, manostats, power management circuits, etc., all of which are well known in the art, so a further description thereof will be omitted in this context. The bus interface serves as an interface. The transceiver 603 can be a number of elements including a transmitter and a receiver which are units for communication with various other devices over a transmission medium. The processor 601 is responsible for managing the bus architecture and performing normal processes, and the memory 602 can store data for use by the processor 601 in performing operations.

The flow of the method for indicating a DMRS at the UE side according to the embodiment of the invention can be applied to the processor 601, or performed by the processor 601. In an implementation, the respective steps in the flow of the method for indicating a DMRS can be performed by integrated logic circuits in hardware, or instructions in software, in the processor 601. The processor 601 can be a general-purpose processor, a digital signal processor DSP, an application specific integrated circuit, a field programmable gate array, or another programmable logic device, discrete gate, transistor logic device, or discrete hardware component. The respective methods, steps, and logic block diagrams disclosed in the embodiments of the invention can be implemented or performed. The general-purpose processor can be a micro processor, or can be any conventional processor, etc. The steps in the method according to the embodiment of the invention can be performed directly by a hardware decoding processor, or performed by a combination of hardware and software modules in the decoding processor. The software module can be located in a random memory, a flash memory, a read-only memory, a programmable read-only memory, an electrically erasable and programmable memory, a register, or another storage medium known in the art. The storage medium is located in the memory 602, and the processor 601 reads the information in the memory 602, and performs the steps in the flow of indicating a DMRS, in combination with the hardware thereof.

Optionally the processor 601 can be configured to read and execute the program in the memory 602; to obtain indication information of the number of transmission data streams of all the UEs scheduled in at least one scheduling resource, or indication information of the number of Resource Elements (REs) occupied by DMRSs corresponding to transmission data streams of all the UEs scheduled in at least one scheduling resource; and to determine a DMRS configuration corresponding to an interference data stream of the UE in the scheduling resource, or RE positions occupied by DMRSs corresponding to the interference data stream according to the obtained indication information.

Optionally the processor 601 can be configured: to obtain a correspondence relationship between the number of transmission data streams, and a set of DMRS configurations from the memory 602, where a value of the number of transmission data streams corresponds uniquely to a set of DMRS configurations; to obtain a set of DMRS configurations corresponding to the number of transmission data streams of all the UEs scheduled in the scheduling resource according to the obtained indication information of the number of transmission data streams of all the UEs scheduled in the at least one scheduling resource, and correspondence relationship between the number of transmission data streams, and a set of DMRS configurations; and to determine the DMRS configuration corresponding to the interference data stream of the UE in the scheduling resource according to the obtained set of DMRS configurations, and DMRS configurations corresponding to transmission data streams of the UE.

Here the correspondence relationship between the number of transmission data streams, and a set of DMRS configurations is configured by the base station to the memory 602 of the UE; or the correspondence relationship between the number of transmission data streams, and a set of DMRS configurations is agreed on in advance between the base station and the UE.

Optionally the processor 601 can be configured: to determine RE positions occupied by the DMRSs corresponding to the transmission data streams of all the UEs scheduled in the scheduling resource according to the obtained indication information of the number of REs occupied by the DMRSs corresponding to the transmission data streams of all the UEs scheduled in the at least one scheduling resource; and to determine the RE positions occupied by the DMRSs corresponding to the interference data stream of the UE in the scheduling resource according to the RE positions occupied by the DMRSs corresponding to the transmission data streams of all the UEs scheduled in the scheduling resource, where the determined RE positions occupied by the DMRSs corresponding to the interference data stream are located among the RE positions occupied by the DMRSs corresponding to the transmission data streams of all the scheduled UEs.

Based upon the same technical idea, an embodiment of the invention further provides a base station, which can perform the flow of the method for indicating a DMRS resource at the base station side as described in the embodiment above.

Figure 7:
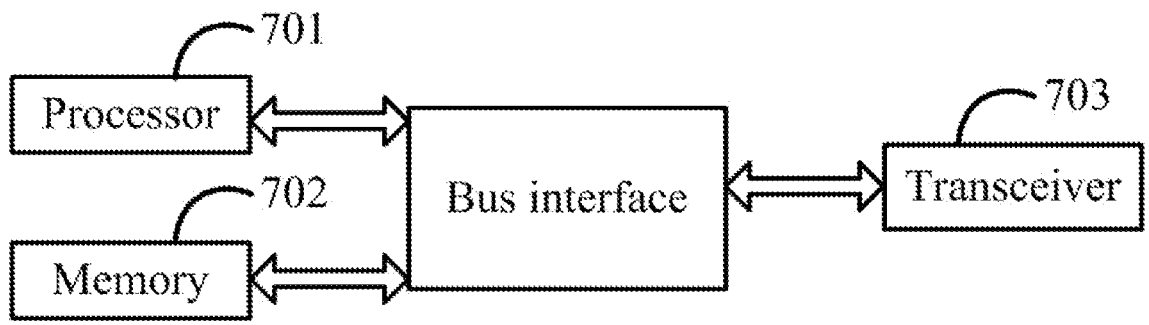
FIG. 7 is a schematic structural diagram of a base station according to an embodiment of the invention.

Referring to FIG. 7 illustrating a schematic structural diagram of a base station according to an embodiment of the invention, the base station can include a processor 701, a memory 702, a transceiver 703, and a bus interface.

The processor 701 is responsible for managing a bus architecture and performing normal processes, and the memory 702 can store data for use by the processor 701 in performing operations. The transceiver 703 is configured to be controlled by the processor 701 to receive and transmit data.

The bus architecture can include any number of interconnecting buses and bridges to optionally link together various circuits including one or more processors represented by the processor 701, and one or more memories represented by the memory 702. The bus architecture can further link together various other circuits, e.g., prophetical devices, manostats, power management circuits, etc., all of which are well known in the art, so a further description thereof will be omitted in this context. The bus interface serves as an interface. The transceiver 703 can be a number of elements including a transmitter and a receiver which are units for communication with various other devices over a transmission medium. The processor 701 is responsible for managing the bus architecture and performing normal processes, and the memory 602 can store data for use by the processor 701 in performing operations.

The flow of the method for indicating a DMRS at the base station side according to the embodiment of the invention can be applied to the processor 701, or performed by the processor 701. In an implementation, the respective steps in the flow of the method for indicating a DMRS can be performed by integrated logic circuits in hardware, or instructions in software, in the processor 701. The processor 701 can be a general-purpose processor, a digital signal processor DSP, an application specific integrated circuit, a field programmable gate array, or another programmable logic device, discrete gate, transistor logic device, or discrete hardware component. The respective methods, steps, and logic block diagrams disclosed in the embodiments of the invention can be implemented or performed. The general-purpose processor can be a micro processor, or can be any conventional processor, etc. The steps in the method according to the embodiment of the invention can be performed directly by a hardware decoding processor, or performed by a combination of hardware and software modules in the decoding processor. The software module can be located in a random memory, a flash memory, a read-only memory, a programmable read-only memory, an electrically erasable and programmable memory, a register, or another storage medium known in the art. The storage medium is located in the memory 702, and the processor 701 reads the information in the memory 702, and performs the steps in the flow of indicating a DMRS, in combination with the hardware thereof.

Optionally the processor 701 can be configured to read the program in the memory 702, and to control the transceiver 703 to perform corresponding operations, where the transceiver 703 can be configured: to transmit indication information of the number of transmission data streams of all the UEs scheduled in at least one scheduling resource, or indication information of the number of REs occupied by DMRSs corresponding to transmission data streams of all the UEs scheduled in at least one scheduling resource to a first UE, where the first UE is any one of all the scheduled terminals, and the indication information is used by the first terminal to determine a DMRS configuration corresponding to an interference data stream of the first UE in the scheduling resource, or RE positions occupied by DMRSs corresponding to the interference data stream.

Optionally the transceiver 703 can be configured to transmit DCI or RRC signaling to the first UE to notify the first UE of the indication information of the number of transmission data streams of all the UEs scheduled in the at least one scheduling resource, or the indication information of the number of REs occupied by the DMRSs corresponding to the transmission data streams of all the UEs scheduled in the at least one scheduling resource.

Optionally the processor 701 can be further configured to read and execute the program in the memory 702; to configure a correspondence relationship between the number of transmission data streams to the first UE, where a value of the number of transmission data streams corresponds uniquely to a set of DMRS configurations; or the correspondence relationship between the number of transmission data streams, and a set of DMRS configurations is agreed on in advance between the base station and the first UE.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for indicating a Demodulation Reference Signal (DMRS), the method comprising:
   obtaining, by a first UE, indication information of a number of Resource Elements (REs) occupied by DMRSs corresponding to transmission data streams of all UEs scheduled in each of at least one scheduling resource, wherein the first UE is any one of all scheduled UEs, and the each of at least one scheduling resource corresponds to one piece of indication information; and
   determining, by the first UE, RE positions occupied by DMRSs corresponding to the interference data stream according to obtained indication information in the each of at least one scheduling resource;
   wherein determining, by the first UE, the RE positions occupied by the DMRSs corresponding to the interference data stream according to the obtained indication information, comprises:
   determining, by the first UE, RE positions occupied by the DMRSs corresponding to the transmission data streams of all the UEs scheduled in the scheduling resource according to the obtained indication information of the number of REs occupied by the DMRSs corresponding to the transmission data streams of all the UEs scheduled in the at least one scheduling resource; and
   determining, by the first UE, the RE positions occupied by the DMRSs corresponding to the interference data stream of the first UE in the scheduling resource according to the RE positions occupied by the DMRSs corresponding to the transmission data streams of all the UEs scheduled in the scheduling resource, wherein the determined RE positions occupied by the DMRSs corresponding to the interference data stream are located among the RE positions occupied by the DMRSs corresponding to the transmission data streams of all the scheduled UEs;
   wherein all the scheduled UEs including the first UE are scheduled over plurality of scheduling resources according to channel conditions, service characteristics, priorities, and other factors, and wherein the scheduling resources are subframes.

2. The method according to claim 1, wherein the indication information is transmitted via the following signaling: Downlink Control Information (DCI) or Radio Resource Control (RRC) signaling.

3. The method according to claim 2, wherein the Downlink Control Information (DCI) is DCI in a common search space.

4. A method for indicating a Demodulation Reference Signal (DMRS), the method comprising:
   transmitting, by a base station, indication information of a number of REs occupied by DMRSs corresponding to transmission data streams of all UEs scheduled in each of at least one scheduling resource to a first UE;
   wherein the first UE is any one of all scheduled UEs, and the each of at least one scheduling resource corresponds to one piece of indication information;
   wherein the indication information is used by the first UE to determine RE positions occupied by DMRSs corresponding to the interference data stream of all the UEs scheduled in the scheduling resource, and to determine the RE positions occupied by the DMRSs corresponding to the interference data stream of the first UE in the scheduling resource according to the RE positions occupied by the DMRSs corresponding to the transmission data streams of all the UEs scheduled in the scheduling resource;
   wherein the determined RE positions occupied by the DMRSs corresponding to the interference data stream are located among the RE positions occupied by the DMRSs corresponding to the transmission data streams of all the scheduled UEs;

wherein all the scheduled UEs including the first UE are scheduled over plurality of scheduling resources according to channel conditions, service characteristics, priorities, and other factors, and wherein the scheduling resources are subframes.

5. The method according to claim 4, wherein the base station transmits DCI or RRC signaling to the first UE, wherein the DCI or RRC signaling indicates to the first UE the number of REs occupied by the DMRSs corresponding to the transmission data streams of all the UEs scheduled in the at least one scheduling resource.

6. A UE, comprising: a first processor and a first memory, wherein:
the first memory is configured to store a program; and
the first processor is configured to read and execute the program in the first memory to: obtain indication information of a number of Resource Elements (REs) occupied by DMRSs corresponding to transmission data streams of all UEs scheduled in each of at least one scheduling resource, wherein the first UE is any one of all scheduled UEs, and the each of at least one scheduling resource corresponds to one piece of indication information; and
determine RE positions occupied by DMRSs corresponding to the interference data stream according to obtained indication information in the each of at least one scheduling resource;
wherein the first processor is configured:
to determine RE positions occupied by the DMRSs corresponding to the transmission data streams of all the UEs scheduled in the scheduling resource according to the obtained indication information of the number of REs occupied by the DMRSs corresponding to the transmission data streams of all the UEs scheduled in the at least one scheduling resource; and
to determine the RE positions occupied by the DMRSs corresponding to the interference data stream of the UE in the scheduling resource according to the RE positions occupied by the DMRSs corresponding to the transmission data streams of all the UEs scheduled in the scheduling resource, wherein the determined RE positions occupied by the DMRSs corresponding to the interference data stream are located among the RE positions occupied by the DMRSs corresponding to the transmission data streams of all the scheduled UEs;
wherein all the scheduled UEs including the first UE are scheduled over plurality of scheduling resources according to channel conditions, service characteristics, priorities, and other factors, and wherein the scheduling resources are subframes.

7. The UE according to claim 6, wherein the indication information is transmitted via the following signaling: Downlink Control Information (DCI) or Radio Resource Control (RRC) signaling.

8. The UE according to claim 7, wherein the Downlink Control Information (DCI) is DCI in a common search space.

9. A base station, comprising: a second processor and a second memory, wherein:
the second memory is configured to store a program; and
the second processor is configured to read and execute the program in the second memory to:
transmit indication information of a number of REs occupied by DMRSs corresponding to transmission data streams of all UEs scheduled in each of at least one scheduling resource to a first UE, wherein the first UE is any one of all scheduled UEs and the each of at least one scheduling resource corresponds to one piece of indication information;
wherein the indication information is used by the first UE to determine RE positions occupied by DMRSs corresponding to the interference data stream of all the UEs scheduled in the scheduling resource, and to determine the RE positions occupied by the DMRSs corresponding to the interference data stream of the first UE in the scheduling resource according to the RE positions occupied by the DMRSs corresponding to the transmission data streams of all the UEs scheduled in the scheduling resource;
wherein the determined RE positions occupied by the DMRSs corresponding to the interference data stream are located among the RE positions occupied by the DMRSs corresponding to the transmission data streams of all the scheduled UEs;
wherein all the scheduled UEs including the first UE are scheduled over plurality of scheduling resources according to channel conditions, service characteristics, priorities, and other factors, and wherein the scheduling resources are subframes.

10. The base station according to claim 9, wherein the second processor is configured to transmit DCI or RRC signaling to the first UE, wherein the DCI or RRC signaling indicates to the first UE the number of REs occupied by the DMRSs corresponding to the transmission data streams of all the UEs scheduled in the at least one scheduling resource.

* * * * *